US012727583B1

(12) United States Patent
Loughmiller, Jr. et al.

(10) Patent No.: US 12,727,583 B1
(45) Date of Patent: Sep. 8, 2026

(54) REMOTE CONTROL RELEASE SYSTEM FOR A DOG LEASH

(71) Applicants: Brian Michael Loughmiller, Jr., Hazel Park, MI (US); Derrick Defever, Plymouth, MI (US)

(72) Inventors: Brian Michael Loughmiller, Jr., Hazel Park, MI (US); Derrick Defever, Plymouth, MI (US)

( * ) Notice: Subject to any disclaimer, the term of this patent is extended or adjusted under 35 U.S.C. 154(b) by 0 days.

(21) Appl. No.: 18/761,608

(22) Filed: Jul. 2, 2024

(51) Int. Cl.
*A01K 27/00* (2006.01)

(52) U.S. Cl.
CPC .................................. *A01K 27/005* (2013.01)

(58) Field of Classification Search
USPC .......................................................... 119/776
See application file for complete search history.

(56) References Cited

U.S. PATENT DOCUMENTS 288,464 A * 11/1883 Martin ...................... B68B 5/08 54/69
445,888 A * 2/1891 Glynn ....................... B68B 5/00 54/70
546,300 A * 9/1895 Clark ........................ B68B 5/00 54/59
1,772,831 A * 8/1930 Hastings ................... B68B 5/00 54/54
2,637,088 A * 5/1953 Foster .................. A01K 27/005 294/118
2,652,809 A * 9/1953 Foster ................... F16B 45/023 119/776
3,505,979 A * 4/1970 Rosswag .............. A01K 15/021 119/772
4,480,428 A * 11/1984 Gilbertson ................ B68B 5/08 54/69
5,100,192 A * 3/1992 McMillan .............. A01K 75/00 294/82.31
5,103,771 A * 4/1992 Lee ...................... A01K 27/005 119/776
5,534,852 A * 7/1996 Schuett ................ A01K 27/005 318/16
6,003,474 A * 12/1999 Slater ................... A01K 15/021 119/908
6,205,956 B1 * 3/2001 Dickie ................. A01K 27/006 119/776

(Continued)

FOREIGN PATENT DOCUMENTS

CN 108338089 A * 7/2018 ............. A01K 27/00
CN 110831435 A * 2/2020 ........... A01K 15/021

(Continued)

*Primary Examiner* — Morgan T Jordan
(74) *Attorney, Agent, or Firm* — CANTOR COLBURN LLP

(57) ABSTRACT

A remote control release system for a dog leash having a leash coupler is provided. The system includes a dog leash release module having a housing, a leash coupling member, a pivoting arm member, an actuator device, an RF receiver, and a microprocessor. The microprocessor generates a control signal to induce the actuator device to move the pivoting arm member from a second operational position to a first operational position in response to an RF signal such that the pivoting arm member disengages from the leash coupling member and the leash coupling member decouples from the leash coupler in a slot in the housing.

18 Claims, 21 Drawing Sheets

(56) References Cited

U.S. PATENT DOCUMENTS

| | | | | |
|---|---|---|---|---|
| 6,308,662 | B1 * | 10/2001 | Furman | A01K 27/005 119/776 |
| 6,352,053 | B1 * | 3/2002 | Records | A01K 15/003 340/573.3 |
| 6,712,026 | B1 * | 3/2004 | Carville, Jr. | A01K 27/005 119/796 |
| 8,196,377 | B1 * | 6/2012 | Putty | B68C 1/00 54/69 |
| 9,009,929 | B2 * | 4/2015 | Genova | A01K 27/005 119/776 |
| 9,861,080 | B1 * | 1/2018 | Hathway | A01K 27/001 |
| 11,256,018 | B2 * | 2/2022 | Defever | G02B 6/0058 |
| 11,612,142 | B1 * | 3/2023 | El-Nakla | A01K 27/009 119/859 |
| 12,219,933 | B1 * | 2/2025 | Anderton | A01K 27/009 |
| 2004/0189477 | A1 * | 9/2004 | Hisano | H02J 7/32 340/573.3 |
| 2005/0145202 | A1 * | 7/2005 | Bonner | A01K 27/003 119/792 |
| 2005/0278908 | A1 * | 12/2005 | Johnson | A01K 27/005 24/600.7 |
| 2007/0095304 | A1 * | 5/2007 | Rosenberg | A01K 29/00 119/720 |
| 2007/0204803 | A1 * | 9/2007 | Ramsay | A01K 27/009 119/720 |
| 2008/0173257 | A1 * | 7/2008 | Steiner | A01K 27/009 119/796 |
| 2011/0197824 | A1 * | 8/2011 | Reese | A01K 27/005 119/796 |
| 2011/0232585 | A1 * | 9/2011 | Rich | A01K 27/009 342/458 |
| 2012/0240867 | A1 * | 9/2012 | Flynn | A01K 1/04 119/721 |
| 2012/0252486 | A1 * | 10/2012 | Lopez | A01K 27/009 455/456.1 |
| 2013/0185901 | A1 * | 7/2013 | Heyman | A44B 99/00 24/303 |
| 2014/0143986 | A1 * | 5/2014 | Genova | A01K 27/005 24/369 |
| 2015/0195058 | A1 * | 7/2015 | Dunnigan | H04K 3/43 455/1 |
| 2016/0050890 | A1 * | 2/2016 | Fitzgerald | A01K 11/008 119/795 |
| 2016/0278346 | A1 * | 9/2016 | Golden | A01K 27/005 |
| 2017/0006834 | A1 * | 1/2017 | Waters | A01K 27/002 |
| 2017/0083018 | A1 * | 3/2017 | Womble | G06V 20/40 |
| 2017/0094941 | A1 * | 4/2017 | Touchton | A01K 27/001 |
| 2018/0184618 | A1 * | 7/2018 | Gotts | A01K 27/009 |
| 2018/0235180 | A1 * | 8/2018 | Gardner | A01K 27/005 |
| 2018/0368365 | A1 * | 12/2018 | Van Curen | A01K 15/021 |
| 2019/0133085 | A1 * | 5/2019 | Clark | A01K 27/005 |
| 2019/0183092 | A1 * | 6/2019 | Couse | H01Q 21/0025 |
| 2020/0100469 | A1 * | 4/2020 | Elam | A01K 27/004 |
| 2020/0107522 | A1 * | 4/2020 | Kersey | G08B 21/0261 |
| 2020/0146262 | A1 * | 5/2020 | Förster | A01K 27/006 |
| 2021/0003765 | A1 * | 1/2021 | Defever | G09F 13/18 |
| 2021/0227789 | A1 * | 7/2021 | Van Curen | A01K 27/009 |
| 2022/0030833 | A1 * | 2/2022 | Kennedy | A01K 11/008 |
| 2022/0071175 | A1 * | 3/2022 | Barak | A01K 27/005 |
| 2022/0125019 | A1 * | 4/2022 | Park | A01K 11/00 |
| 2022/0183259 | A1 * | 6/2022 | Oswald | H04W 4/029 |
| 2022/0386568 | A1 * | 12/2022 | Myton | A01K 27/009 |
| 2022/0408696 | A1 * | 12/2022 | Craddock | A01K 27/002 |
| 2023/0008166 | A1 * | 1/2023 | Antoniou | A01M 29/24 |
| 2024/0298611 | A1 * | 9/2024 | Welsh | A01K 27/006 |
| 2024/0341279 | A1 * | 10/2024 | Ames | A01K 15/021 |
| 2024/0423167 | A1 * | 12/2024 | Anantaraman | A01K 29/005 |
| 2025/0000060 | A1 * | 1/2025 | Harris | H04R 1/028 |
| 2025/0064022 | A1 * | 2/2025 | Liu | A01K 15/04 |
| 2025/0204497 | A1 * | 6/2025 | Zhou | A01K 27/006 |
| 2025/0261616 | A1 * | 8/2025 | Munoz | A01K 27/002 |

FOREIGN PATENT DOCUMENTS

| | | | | |
|---|---|---|---|---|
| FR | 2582766 | A1 * | 12/1986 | A01K 27/005 |
| GB | 2364202 | A * | 1/2002 | G07C 9/38 |
| GB | 2575507 | A * | 1/2020 | A01K 27/009 |
| KR | 20190027543 | A * | 3/2019 | A01K 27/001 |
| KR | 102093472 | B1 * | 3/2020 | A01K 27/009 |
| KR | 102214408 | B1 * | 2/2021 | G08B 3/1033 |
| WO | WO-8903173 | A1 * | 4/1989 | F16B 45/026 |
| WO | WO-2012042205 | A1 * | 4/2012 | A01K 27/004 |
| WO | WO-2014177130 | A1 * | 11/2014 | F16B 45/034 |
| WO | WO-2017023116 | A1 * | 2/2017 | A01K 29/00 |
| WO | WO-2017033528 | A1 * | 3/2017 | A01K 11/00 |
| WO | WO-2018147556 | A1 * | 8/2018 | A01K 27/009 |
| WO | WO-2023041160 | A1 * | 3/2023 | A01K 27/005 |

* cited by examiner

REMOTE CONTROL RELEASE SYSTEM FOR A DOG LEASH

BACKGROUND

In the military and police fields, dog handlers must stay alert and act quickly when they encounter potentially dangerous assailants. Typically, it takes a dog handler at least five seconds to release a dog from a leash. During this time, a potentially dangerous assailant could draw or fire a weapon at the dog handler or determine how to escape to avoid arrest.

The inventors herein have recognized a need for an improved remote control release system for a dog leash that reduces the amount of time it takes for a dog handler to release a dog from a leash and greatly increase handler safety.

SUMMARY

A remote control release system for a dog leash in accordance with an exemplary embodiment is provided. The dog leash has a leash coupler. The remote control release system includes a dog leash release module having a housing, a leash coupling member, a pivoting arm member, an actuator device, an RF receiver, and a microprocessor. The housing has a slot extending therein for receiving the leash coupler therein. The leash coupling member is rotatably coupled to the housing and has a first finger portion. The leash coupling member is biased in a first rotational direction by a spring. The pivoting arm member is rotatably coupled to the housing. The pivoting arm member has a first operational position such the pivoting arm member does not engage the leash coupling member and the first finger portion does not extend across the slot of the housing such that the leash coupler is received in the slot. The pivoting arm member has a second operational position such that the pivoting arm member contacts and holds the leash coupling member and the first finger portion extends across the slot to couple the first finger portion to the leash coupler in the slot. The actuator device is disposed in the housing and is operably coupled to the pivoting arm member. The RF receiver is disposed in the housing and receives an RF signal. The microprocessor is disposed in the housing and is operably coupled to the RF receiver. The microprocessor generates a control signal to induce the actuator device to move the pivoting arm member from the second operational position to the first operational position in response to the RF signal such that the pivoting arm member disengages from the leash coupling member and the leash coupling member decouples from the leash coupler in the slot.

A dog harness assembly in accordance with an exemplary embodiment is removably coupled to a dog leash. The dog leash has a leash coupler. The dog harness assembly includes a dog harness. The dog harness assembly further includes a remote control release system coupled to the dog harness. The remote control release system has a dog leash release module. The dog leash release module has a housing, a leash coupling member, a pivoting arm member, an actuator device, an RF receiver, and a microprocessor. The housing has a slot extending therein for receiving the leash coupler therein. The leash coupling member is rotatably coupled to the housing and has a first finger portion. The leash coupling member is biased in a first rotational direction by a spring. The pivoting arm member is rotatably coupled to the housing. The pivoting arm member has a first operational position such the pivoting arm member does not engage the leash coupling member and the first finger portion does not extend across the slot of the housing such that the leash coupler is received in the slot. The pivoting arm member has a second operational position such that the pivoting arm member contacts the leash coupling member and the first finger portion extends across the slot to couple the first finger portion to the leash coupler in the slot. The actuator device is disposed in the housing and is operably coupled to the pivoting arm member. The RF receiver is disposed in the housing and receives an RF signal. The microprocessor is disposed in the housing and is operably coupled to the RF receiver. The microprocessor generates a control signal to induce the actuator device to move the pivoting arm member from the second operational position to the first operational position in response to the RF signal such that the pivoting arm member disengages from the leash coupling member and the leash coupling member decouples from the leash coupler in the slot.

DETAILED DESCRIPTION

Referring to FIGS. 1-13, a dog leash 20 and a dog harness assembly 30 in accordance with an exemplary embodiment are illustrated.

Dog Leash

Figure 1:
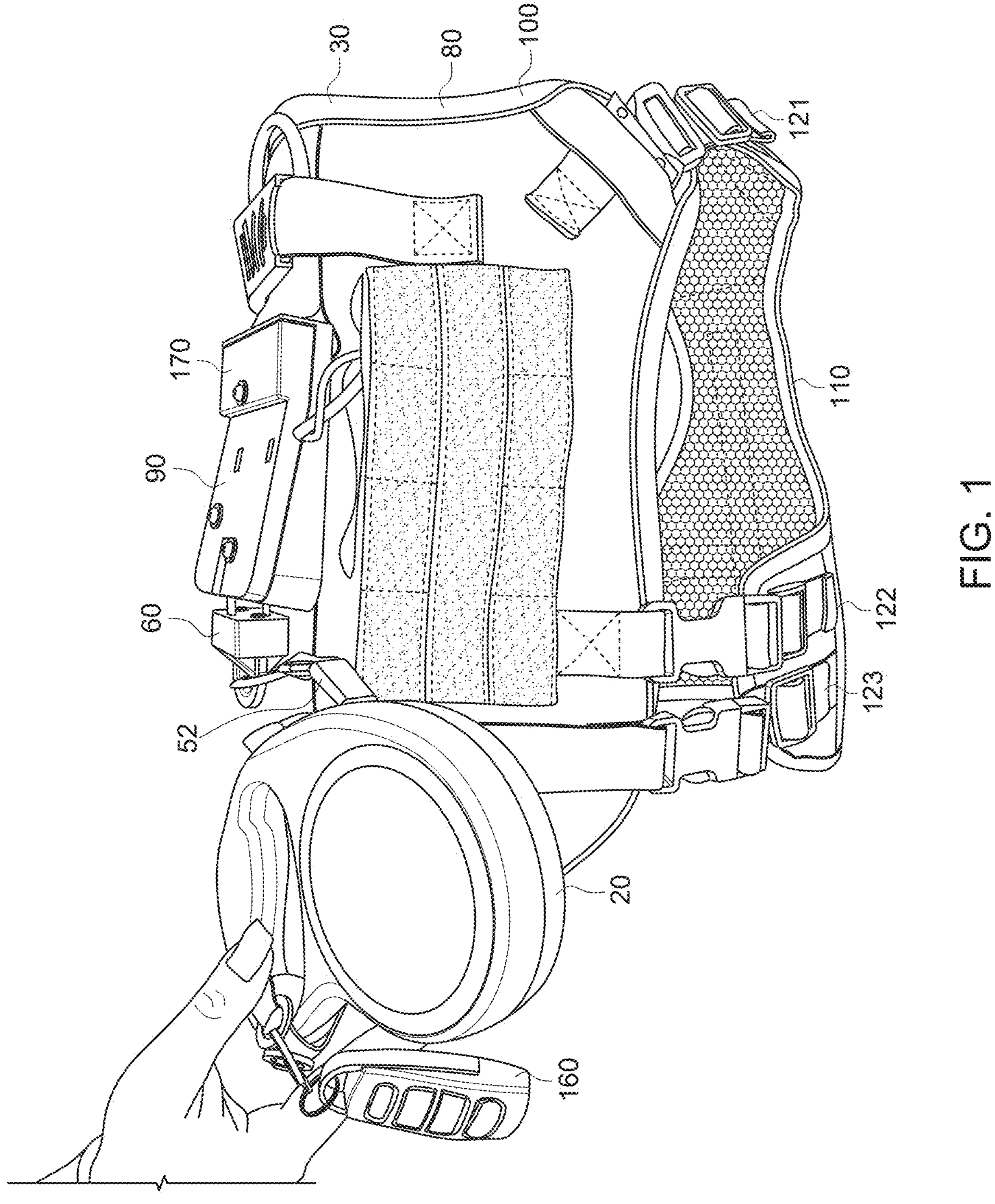
FIG. 1 is an isometric view of a dog leash and a dog harness assembly in accordance with an exemplary embodiment.
Figure 2:
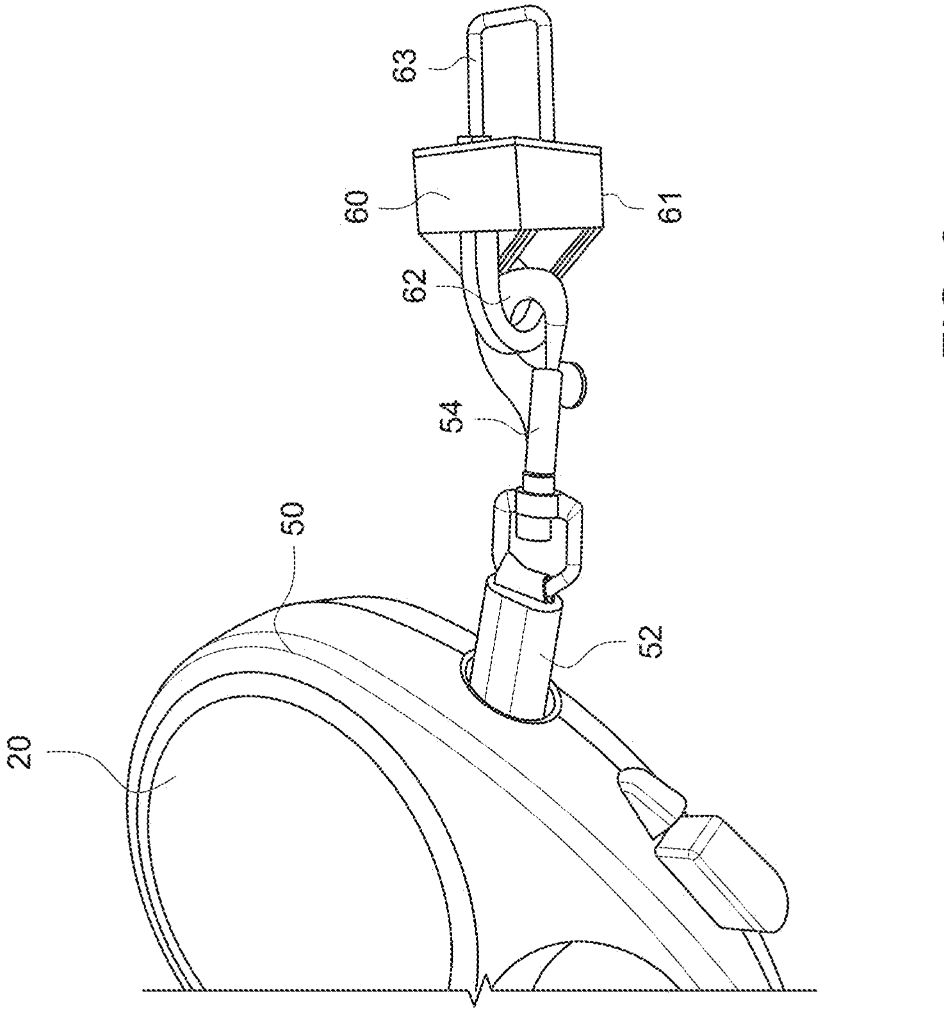
FIG. 2 is an isometric view of the dog leash of FIG. 1.

Referring to FIGS. 1 and 2, the dog leash 20 is removably coupled to the dog harness assembly 30. The dog leash 20 includes a housing 50, a strap 52, a slide bolt spring snap 54, and a leash coupler 60. The housing 50 holds a portion of the strap 52 therein. The slide bolt spring snap 54 is coupled to an end of the strap 52. Further, the leash coupler 60 is coupled to the slide bolt spring snap 54.

The leash coupler 60 includes a central body 61, a ring-shaped portion 62, and a rectangular ring-shaped portion 63. The ring shaped portion 62 is integrally formed with a first end of the central body 61 and is further coupled to the slide bolt spring snap 54. The rectangular ring-shaped portion 63 is coupled to a second end of the central body 61. In an exemplary embodiment, the central body 61 and the ring-shaped portion 62 are constructed of plastic. Further, the rectangular ring-shaped portion 63 is constructed of a metal such as steel.

Dog Harness Assembly

Referring to FIGS. 1-9, the dog harness assembly 30 is sized and shaped to be worn by a dog. The dog harness assembly 30 includes a dog harness 80 and a remote control release system 90.

Dog Harness

Referring to FIGS. 1-8, the dog harness 80 includes a back pad 100, an abdomen pad 110, and first, second, third, fourth, fifth, sixth adjustable straps 121, 122, 123, 124, 125, 126. The back pad 100 is coupled to the abdomen pad 110 utilizing the first, second, third, fourth, fifth, sixth adjustable straps 121, 122, 123, 124, 125, 126. The back pad 100 includes a pocket portion 140 that holds the battery module 194 therein.

Remote Control Release System

Referring to FIGS. 1, 2 and 9-19, the remote control release system 90 is provided to allow a dog handler to release the leash coupler 60. The remote control release system 90 includes a hand-held remote control module 160 and a dog leash release module 170.

Hand-Held Remote Control Module

Figure 3:
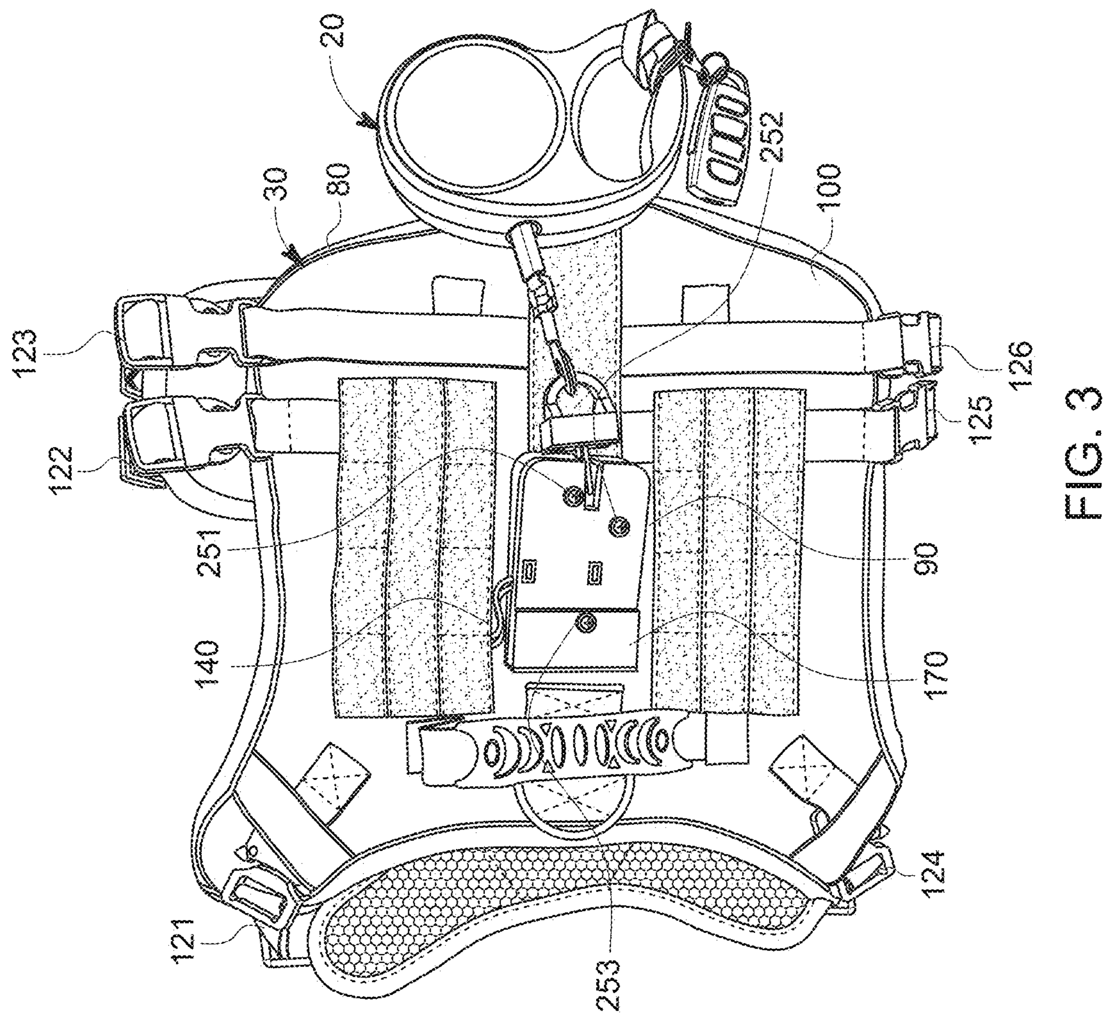
FIG. 3 is a top view of the dog harness assembly having a dog harness and a remote control release system in accordance with an exemplary embodiment, and the dog leash of FIG. 1.
Figure 4:
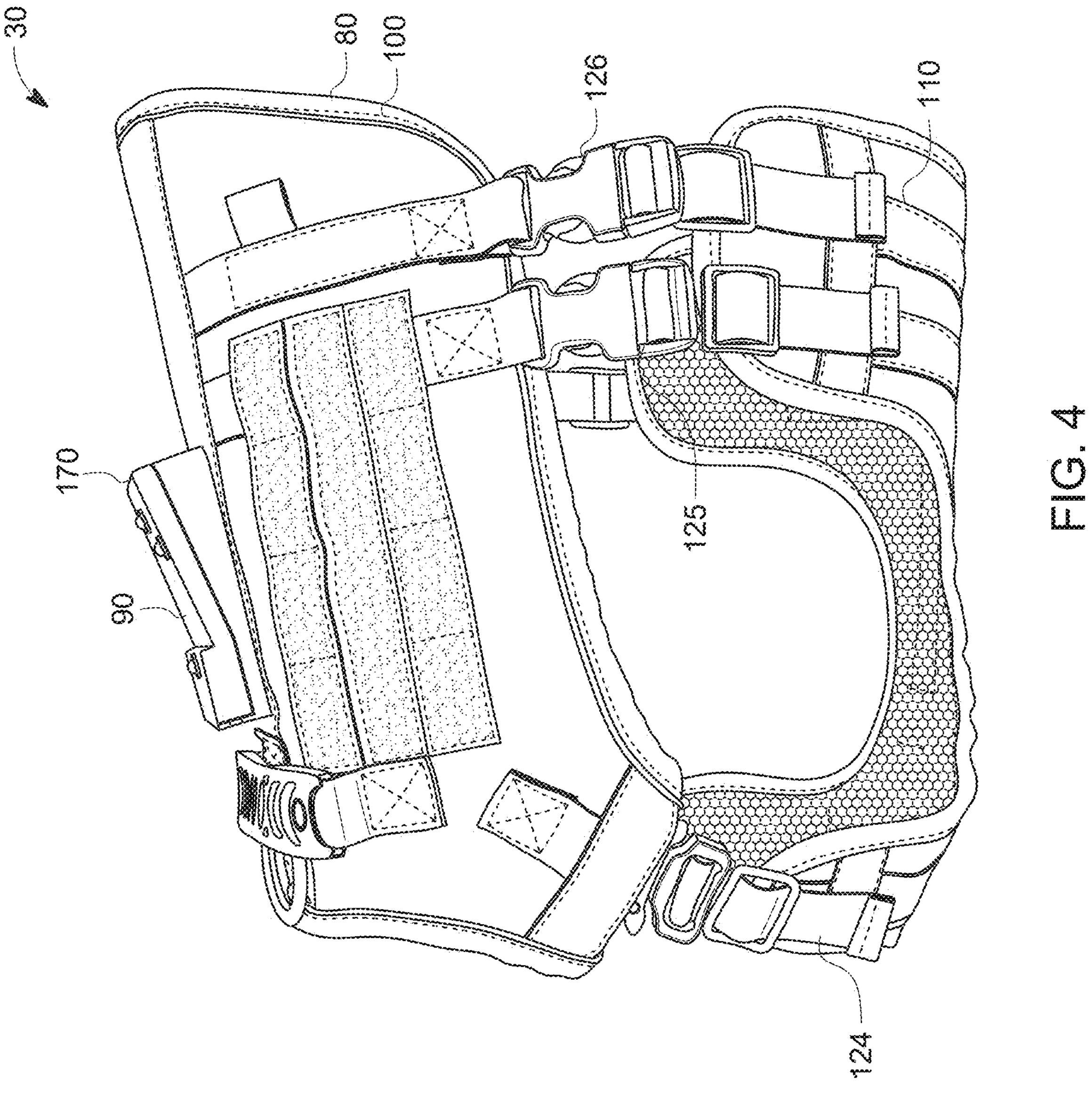
FIG. 4 is a first side view of the dog harness assembly of FIG. 3.
Figure 5:
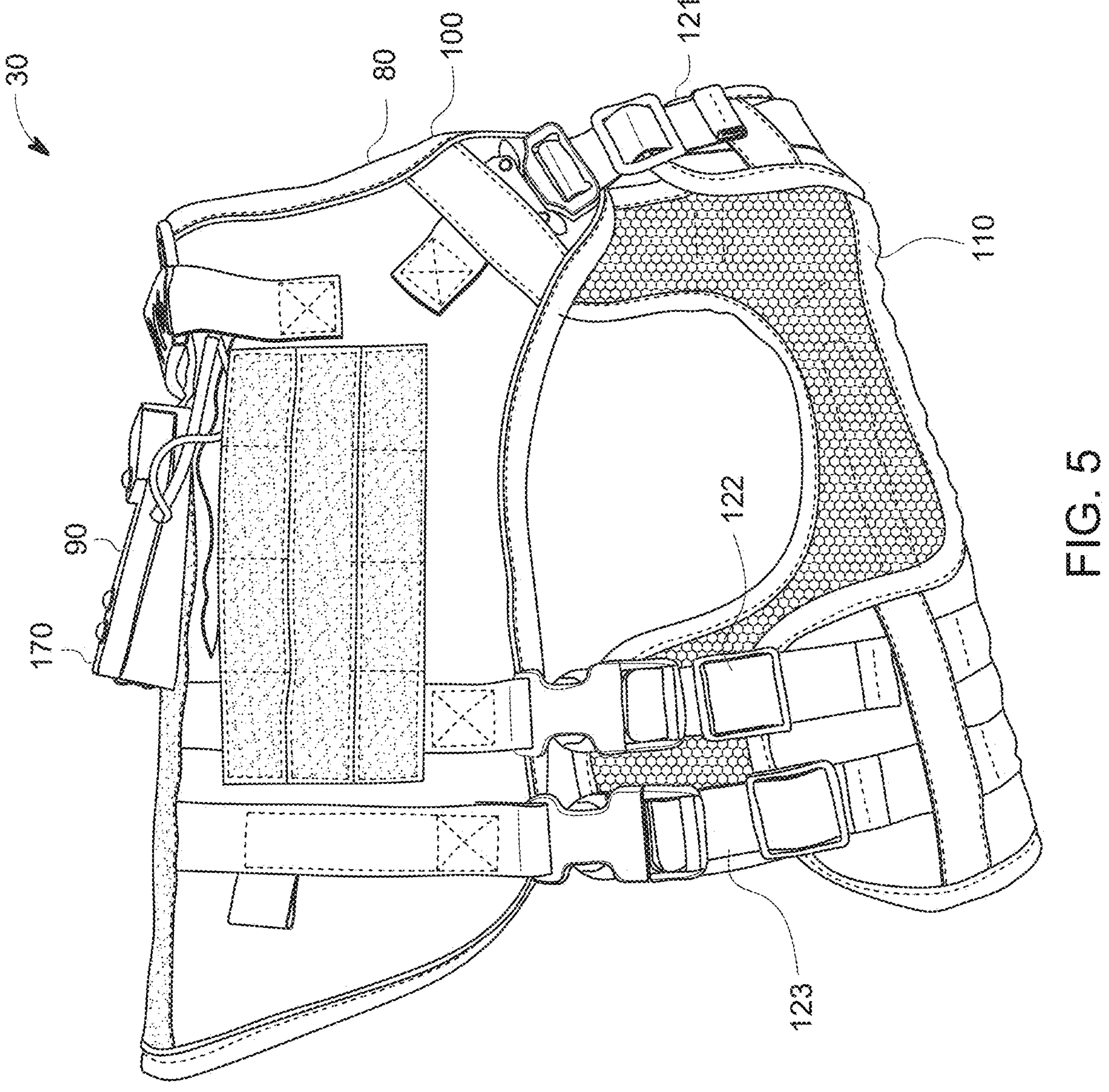
FIG. 5 is a second side view of the dog harness assembly of FIG. 3.
Figure 9:
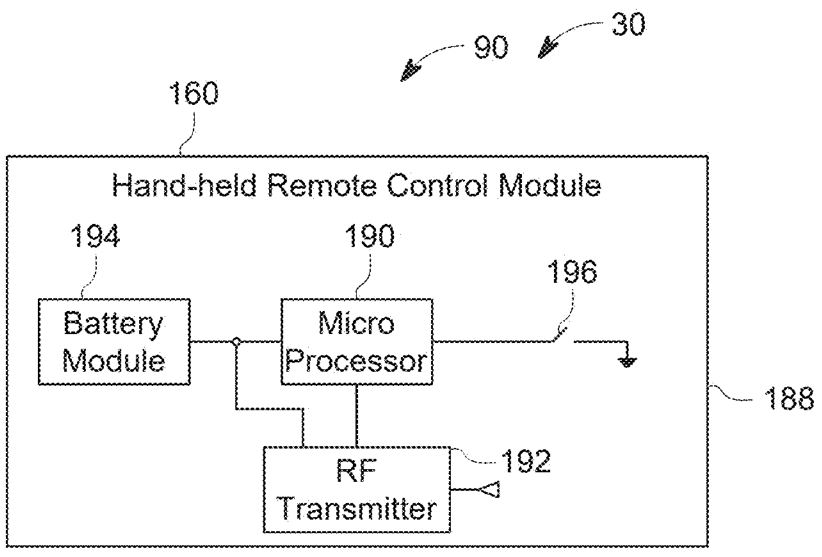
FIG. 9 is a block diagram of a hand-held remote control module utilized in the remote control release system of FIG. 3.
Figure 9:
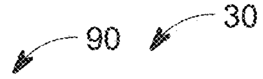

Referring to FIGS. 1, 3 and 9, the hand-held remote control module 160 is provided to generate an RF signal that is received by the dog leash release module 170 to induce the module 170 to release the leash coupler 60. The hand-held remote control module 160 includes a housing 188, a microprocessor 190, an RF transmitter 192, a battery module 94, and a switch 196. The microprocessor 190, the RF transmitter 192, and the battery module 94 are disposed in the housing 188. The switch 196 is operably coupled to the housing 188.

The battery module 94 is electrically coupled to the microprocessor 190 and the RF transmitter 192 and provides an operational voltage to the microprocessor 190 and the RF transmitter 192.

The microprocessor 190 is operably coupled to the RF transmitter 192 and the electrical switch 196. The switch 196 is further electrically coupled to electrical ground. When the switch 196 has a closed operational state, the microprocessor 190 generates a control signal to induce the RF transmitter 192 to transit an RF signal that is received by the dog leash release module 170. In response to the RF signal, the dog leash release module 170 releases the leash coupler 60.

Dog Leash Release Module

Figure 8:
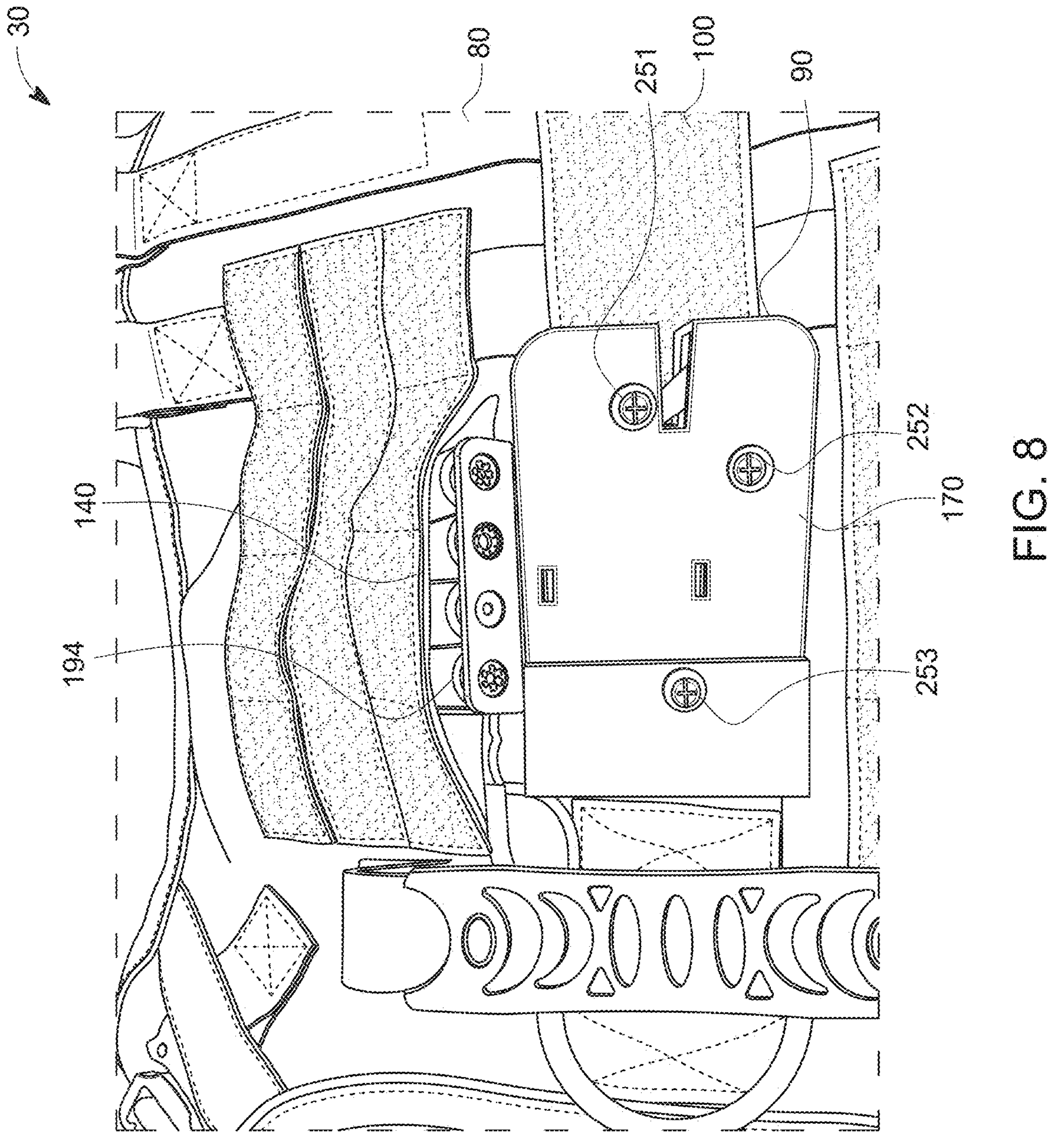
FIG. 8 is an enlarged view of a portion of the dog harness assembly of FIG. 3 showing the battery module being installed in the pocket of the dog harness assembly.

Referring to FIGS. 3 and 11-19, the dog leash release module 170 includes a housing 220, the leash coupling member 222, a spring 224 (shown in FIG. 19), a pivoting arm member 226, an actuator device 228, an RF receiver 232, a battery module 234, an electrical switch 240, a microprocessor 242, and first, second, third bolts 251, 252, 253 (shown in FIGS. 3 and 8).

Housing

Referring to FIGS. 10 and 14-20, the housing 220 includes a lower housing portion 270, an upper housing portion 272, and a slot 274. The housing 220 holds the leash coupling member 222, the spring 224, the pivoting arm member 226, the actuator device 228, the RF receiver 232 (shown in FIG. 10), and the microprocessor 242 therein. The switch 240 is operably coupled to the housing 220.

Figure 16:
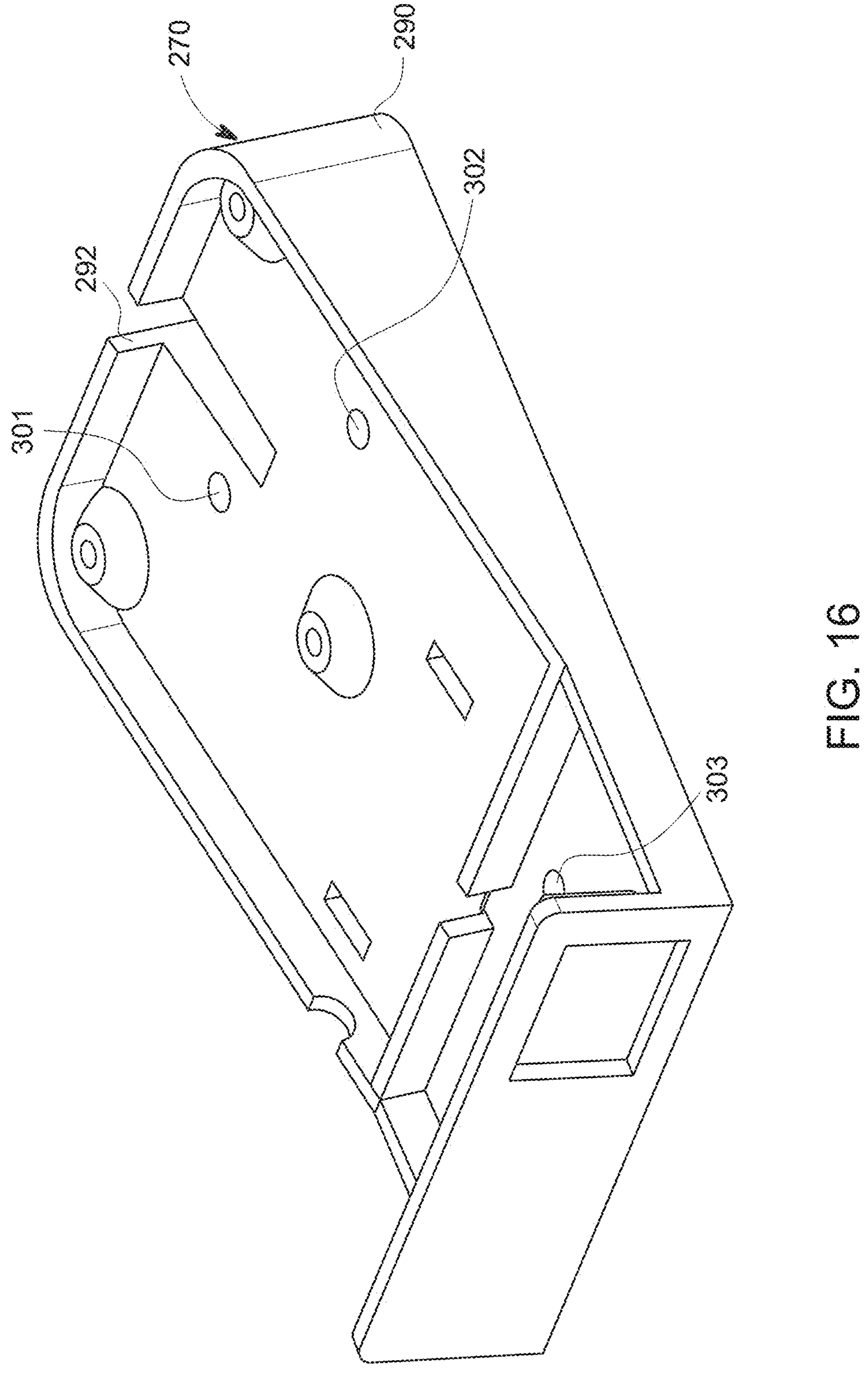
FIG. 16 is an isometric view of a lower housing portion of the housing of FIG. 14.
Figure 17:
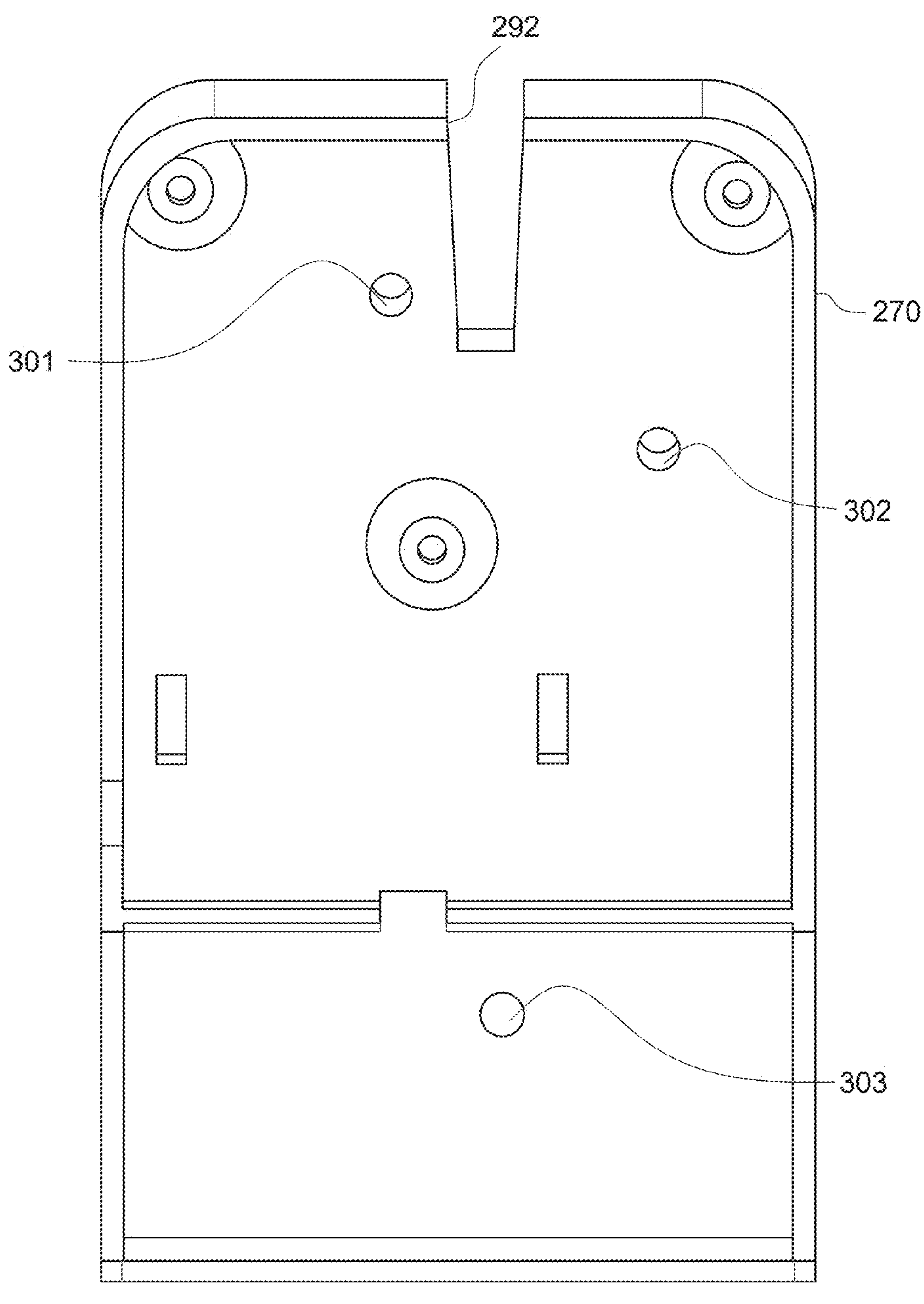
FIG. 17 is a top view of the lower housing portion of FIG. 16.

Referring to FIGS. 16 and 17, the lower housing portion 270 includes a body portion 290 having a slot portion 292 and first, second, third, fourth apertures 301, 302, 303, 304 extending therethrough.

Figure 14:
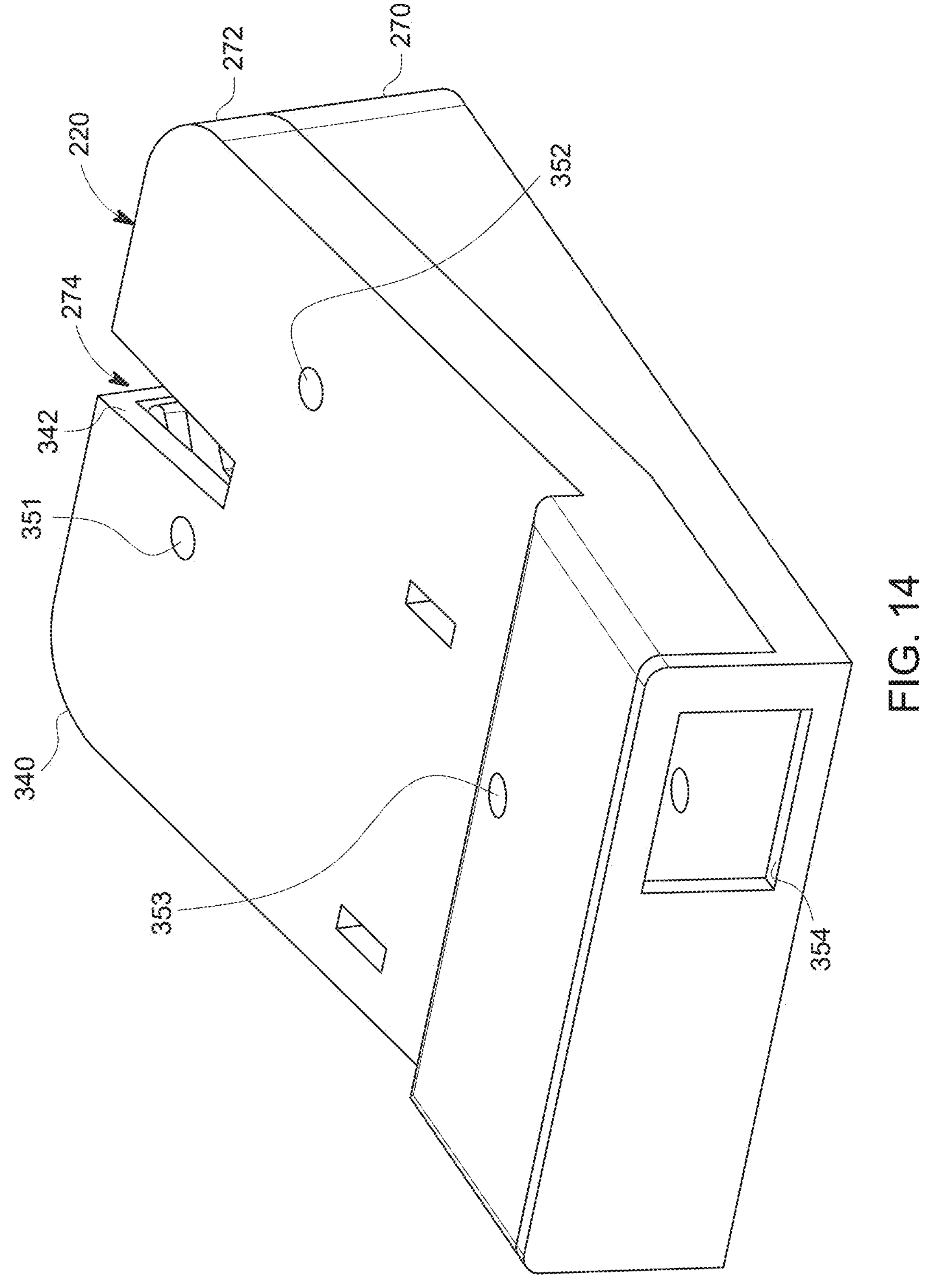
FIG. 14 is an isometric view of a housing utilized in the dog leash release module of FIG. 11.
Figure 15:
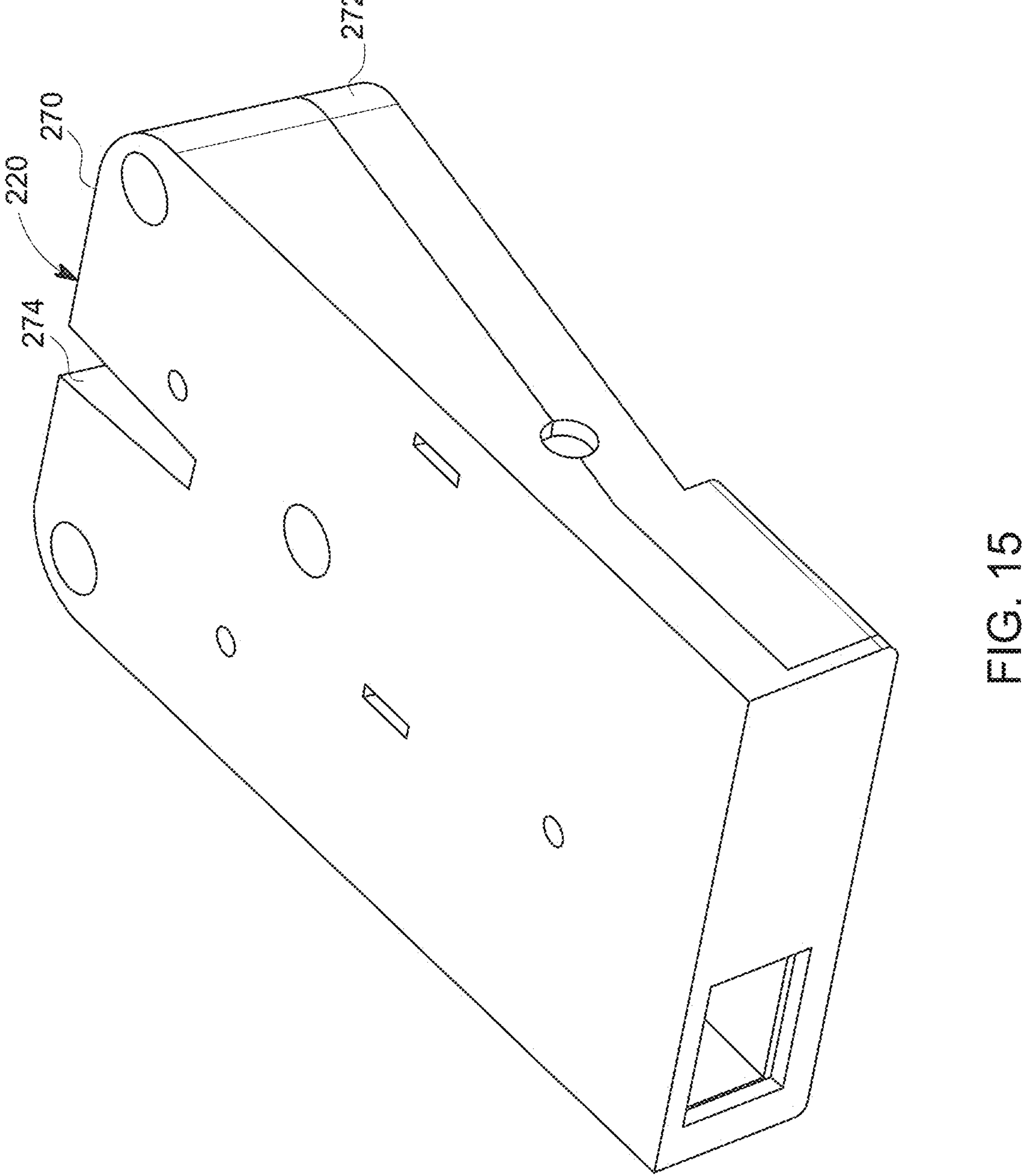
FIG. 15 is another isometric view of the housing of FIG. 14.
Figure 18:
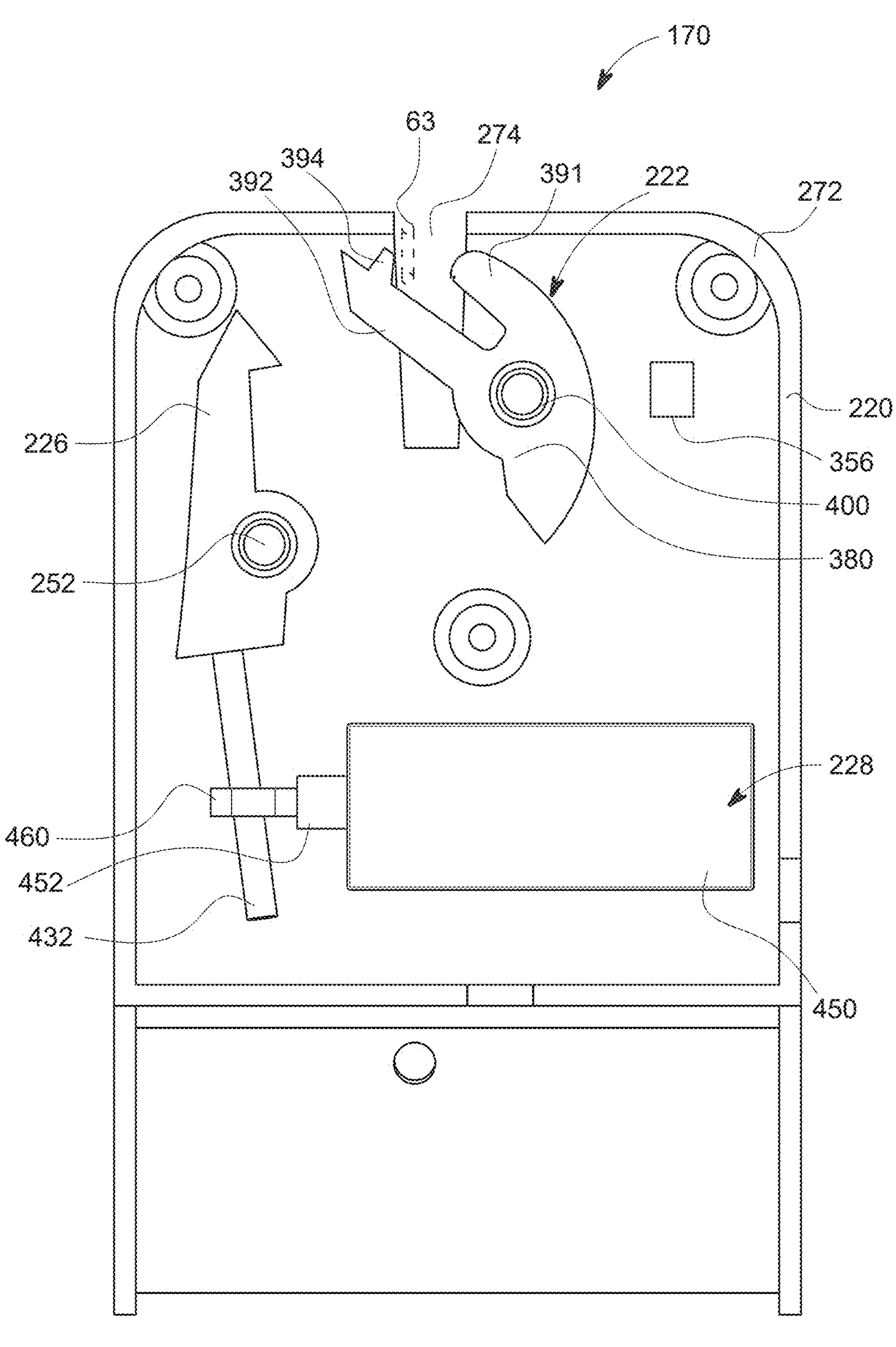
FIG. 18 is a cross-sectional view of the dog leash release module of FIG. 11 taken along lines 19-19 in FIG. 11 when a pivoting arm member has a first operational position such the pivoting arm member does not engage a leash coupling member.

Referring to FIGS. 14 and 18, the upper housing portion 272 includes a body portion 340 having a slot portion 342 and first, second, third, fourth apertures 351, 352, 353, 354 extending therethrough. A tab 356 is coupled to and extends outwardly from the body portion 340.

When the upper housing portion 272 is disposed on the lower housing portion 270, the slot portion 292 and the slot portion 342 align with one another to form the slot 274 that is sized and shaped to receive the rectangular ring-shaped portion 63 of the leash coupler 60 therein.

Referring to FIGS. 8, 14 and 16, the first bolt 251 extends through the first aperture 301 of the lower housing portion 270 and the first aperture 351 of the upper housing portion 272 to couple the lower housing portion 270 to the upper housing portion 272. Further, the second bolt 252 extends through the second aperture 302 of the lower housing portion 270 and the second aperture 352 of the upper housing portion 272 to couple the lower housing portion 270 to the upper housing portion 272. Also, the third bolt 253 extends through the third aperture 303 of the lower housing portion 270 and the third aperture 353 of the upper housing portion 272 to couple the lower housing portion 270 to the upper housing portion 272.

Leash Coupling Member

Figure 19:
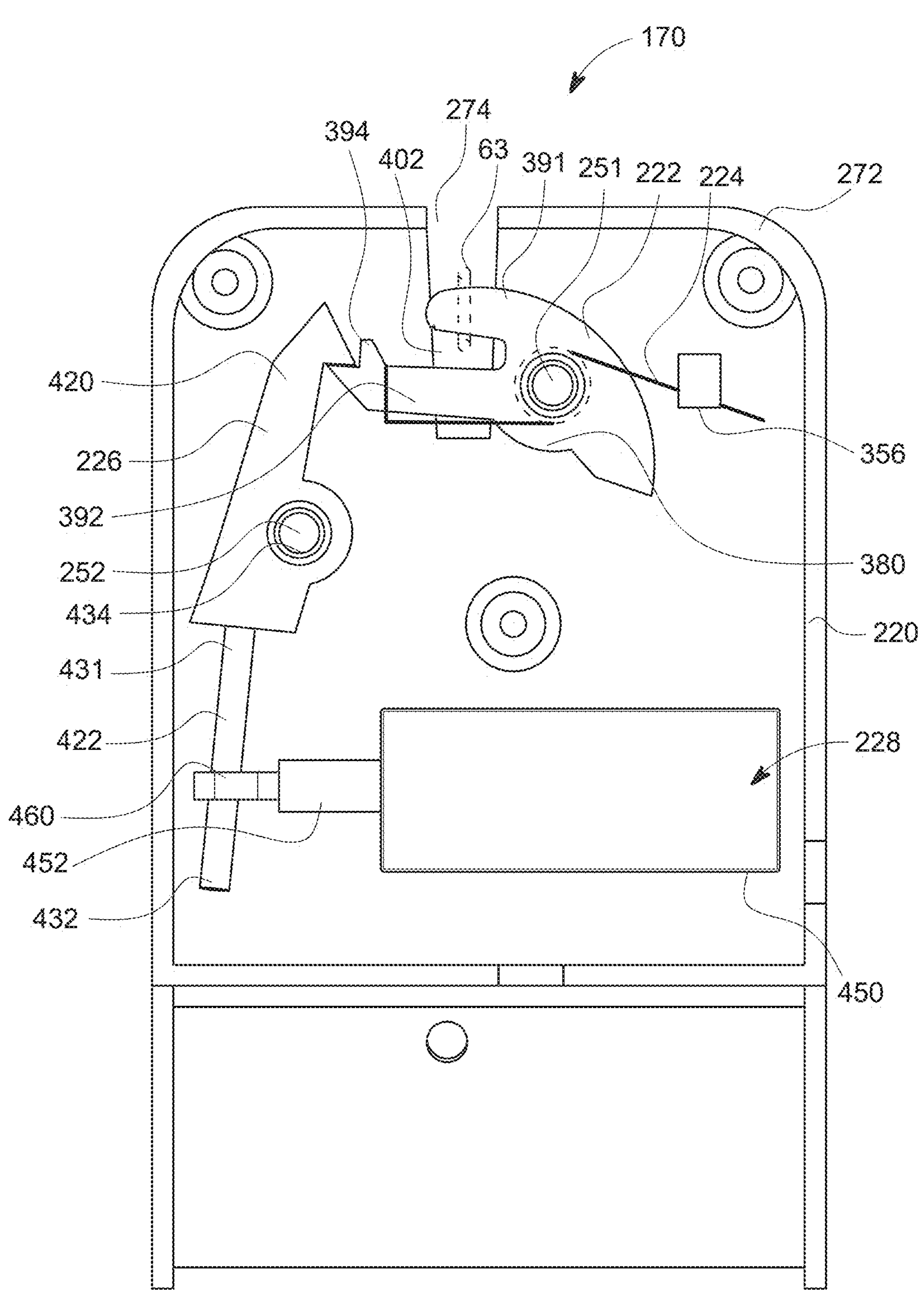
FIG. 19 is a cross-sectional view of the dog leash release module of FIG. 13 taken along lines 13-13 in FIG. 13 when a pivoting arm member has a second operational position such the pivoting arm member can engage and hold a leash coupling member.
Figure 20:
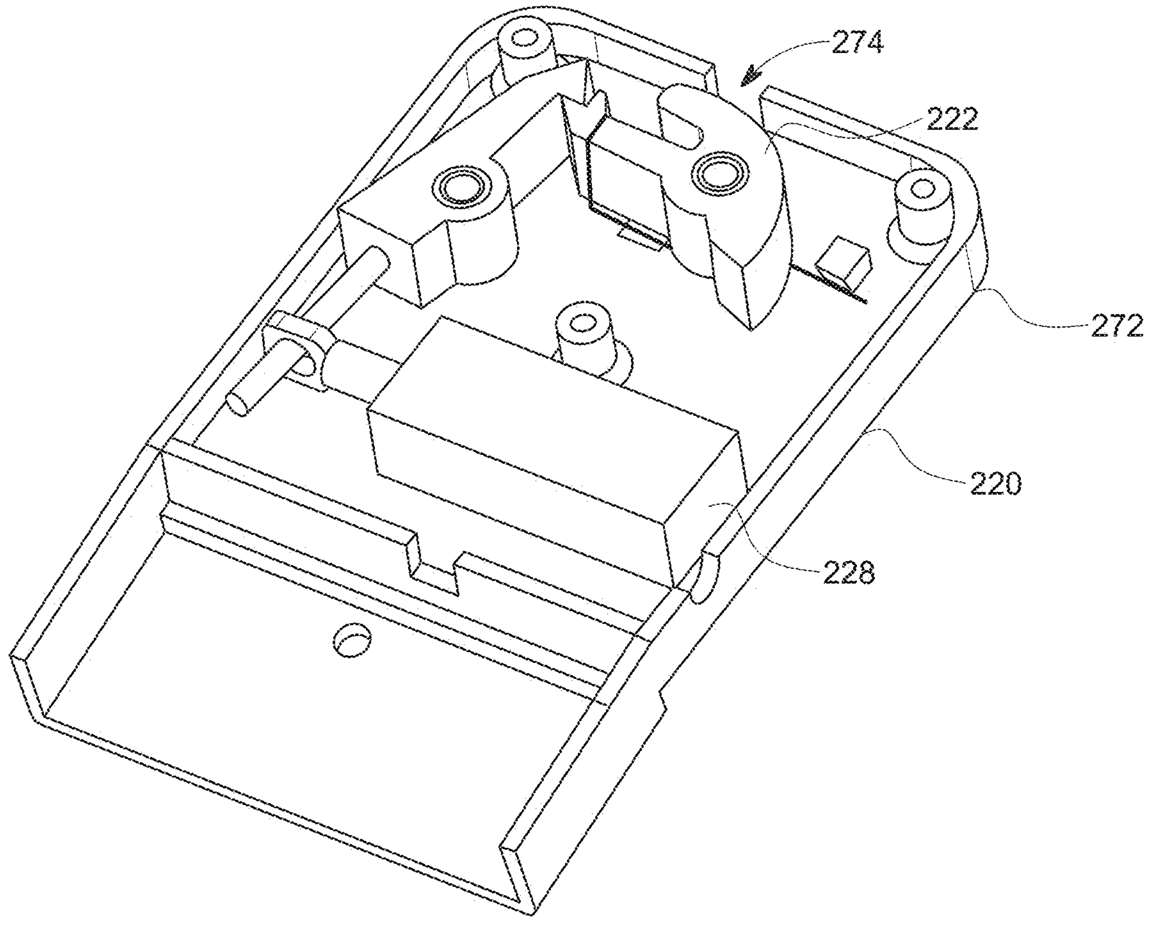
FIG. 20 is an isometric view of the dog leash release module of FIG. 19.

Referring to FIGS. 18-20, the leash coupling member 22 is provided to engage the rectangular ring-shaped portion 63 of the leash coupler 60 of the dog leash 20 to prevent the dog leash 20 from being detached from the dog harness 80 when the leash coupling member 22 extends across the slot 274. Further, the leash coupling member 20 is provided to selectively disengage the rectangular ring-shaped portion 63 of the leash coupler 60 to allow the dog harness 80 to be detached from the dog harness 80 when the leash coupling member 22 does not extend across the slot 274.

The leash coupling member 222 is rotatably coupled to the housing 220 and has a central body portion 380, a first finger portion 391, a second finger portion 392, and a tab 394. The first and second finger portions 391, 392 are coupled to and extend from the central body portion 380 such that a gap 402 (shown in FIG. 19) is formed between the first and second finger portions 391, 392. The first finger portion 391 is sized to be received within rectangular ring-shaped portion 63 of the leash coupler 60 and has an arcuate-shaped tip portion. The tab 394 is provided to guide the rectangular ring-shaped portion 63 of the leash coupler 60 onto the second finger portion 392. The gap 402 is sized and shaped to receive a portion of the rectangular ring-shaped portion 63 therein. The central body portion 380 includes an aperture 400 (shown in FIG. 18) extending therethrough that receives the first bolt 251 therethrough for rotatably coupling the central body portion 380 to the housing 220. The second finger portion 392 extends in a same direction as the first finger portion 391 and a longitudinal length of the second finger portion 392 is greater than a longitudinal length of the first finger portion 391. The leash coupling member 22 is biased in a first rotational direction (e.g., clockwise in FIG. 18 by a spring 224. The spring 224 is coupled to both the leash coupling member 222 and to the tab 356 of the upper housing portion 272 of the housing 220.

Referring to FIG. 18, the leash coupling member 22 has a first operational position in which the first finger portion 391 does not extend across the slot 274 and is disengaged from the pivoting arm member 226. Further, in the first operational position of the leash coupling member 222, the first finger portion 391 is not coupled to the rectangular ring-shaped portion 63 of the leash coupler 60

Referring to FIG. 19, the leash coupling member 22 has a second operational position in which the first finger portion 391 extends across the slot 274 and engages and holds the pivoting arm member 226. Further, in the second operational position of the leash coupling member 222, the first finger portion 391 is received in the rectangular ring-shaped portion 63 of the leash coupler 60 and holds the rectangular ring-shaped portion 63 thereon.

Pivoting Arm Member

The pivoting arm member 226 includes a finger member 420 and a coupling rod 422. The coupling rod 422 has first and second end portions 431, 432. The first end portion 431 is coupled to the finger member 420. The second end portion 432 is coupled to the actuator device 228. The finger portion 420 has an aperture 434 extending therethrough that receives the second bolt 252 (shown in FIG. 8) therethrough for rotatably coupling the pivoting arm member 226 to the housing 220.

Referring to FIG. 18, the pivoting arm member 226 has a first operational position such the pivoting arm member 226 does not engage the leash coupling member 222 and the first finger portion 391 does not extend across the slot 274 of the housing 220 such that a portion of the leash coupler 60 is received in the slot 274.

Referring to FIG. 19, the pivoting arm member 226 has a second operational position such that the pivoting arm member 226 contacts and holds the leash coupling member 222. In particular, the finger member 420 of the pivoting arm member 226 contacts the second finger portion 392 of the leash coupling member 222 and prevents the leash coupling member 22 from rotating in the first rotational direction (e.g., clockwise in FIG. 19) when the pivoting arm member 226 has the second operational position (e.g., counter-clockwise in FIG. 19). The leash coupling member 22 is moved to a second operational position by being rotated in the second rotational direction by the rectangular ring-shaped portion 63 of the leash coupler 60 being pushed against the pivoting arm member 226. When the pivoting arm member 226 has the second operational position, the first finger portion 391 extends across the slot 274 to couple the first finger portion 391 to the portion 63 of the leash coupler 60 in the slot 274.

Actuator Device 228

Referring to FIG. 18, the actuator device 228 is disposed in the housing 220 and is operably coupled to the pivoting arm member 226. In an exemplary embodiment, the actuator device 228 is a linear actuator having a linear actuator portion 450 and a shaft member 452. The shaft member 452 has a ring-shaped tip portion 460. The second end portion 432 of the coupling rod 422 extends through the ring-shaped tip portion 460 to couple the second end portion 432 to the shaft member 452. The linear actuator portion 450 moves the shaft member 452 inwardly and outwardly along a longitudinal axis of the linear actuator portion 450. In particular, referring to FIG. 18, the actuator device 228 moves the shaft member 452 to a first operational position utilizing an internal spring in which the shaft member 452 is moved inwardly into the linear actuator portion 450 such that the pivoting arm member 226 is moved away from the leash coupling member 220. Further, referring to FIG. 19, the actuator device 228 moves the shaft member 452 to a second operational position in which the shaft member 452 is moved outwardly from the linear actuator portion 450 such that the pivoting arm member 226 contacts and holds the leash coupling member 220. The actuator device 228 moves the shaft member 452 to the second operational position in response to receiving a control signal from the microprocessor 242.

Electrical Switch

Figure 6:
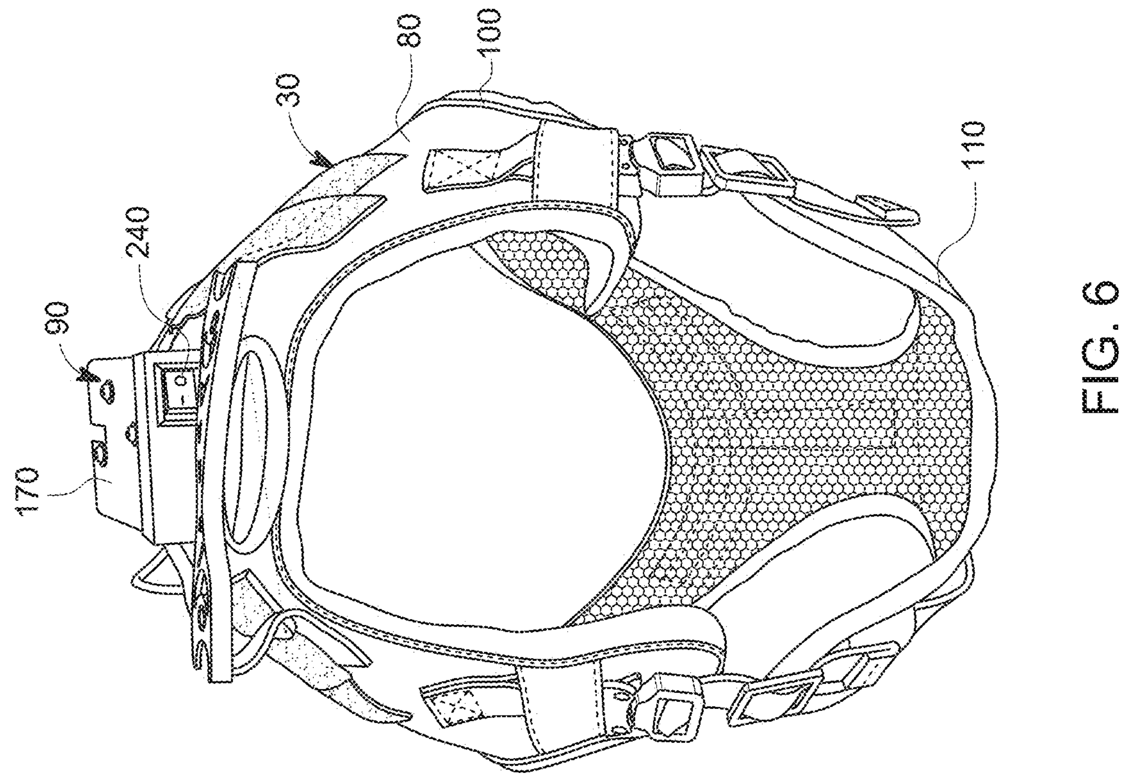
FIG. 6 is a front view of the dog harness assembly of FIG. 3.
Figure 7:
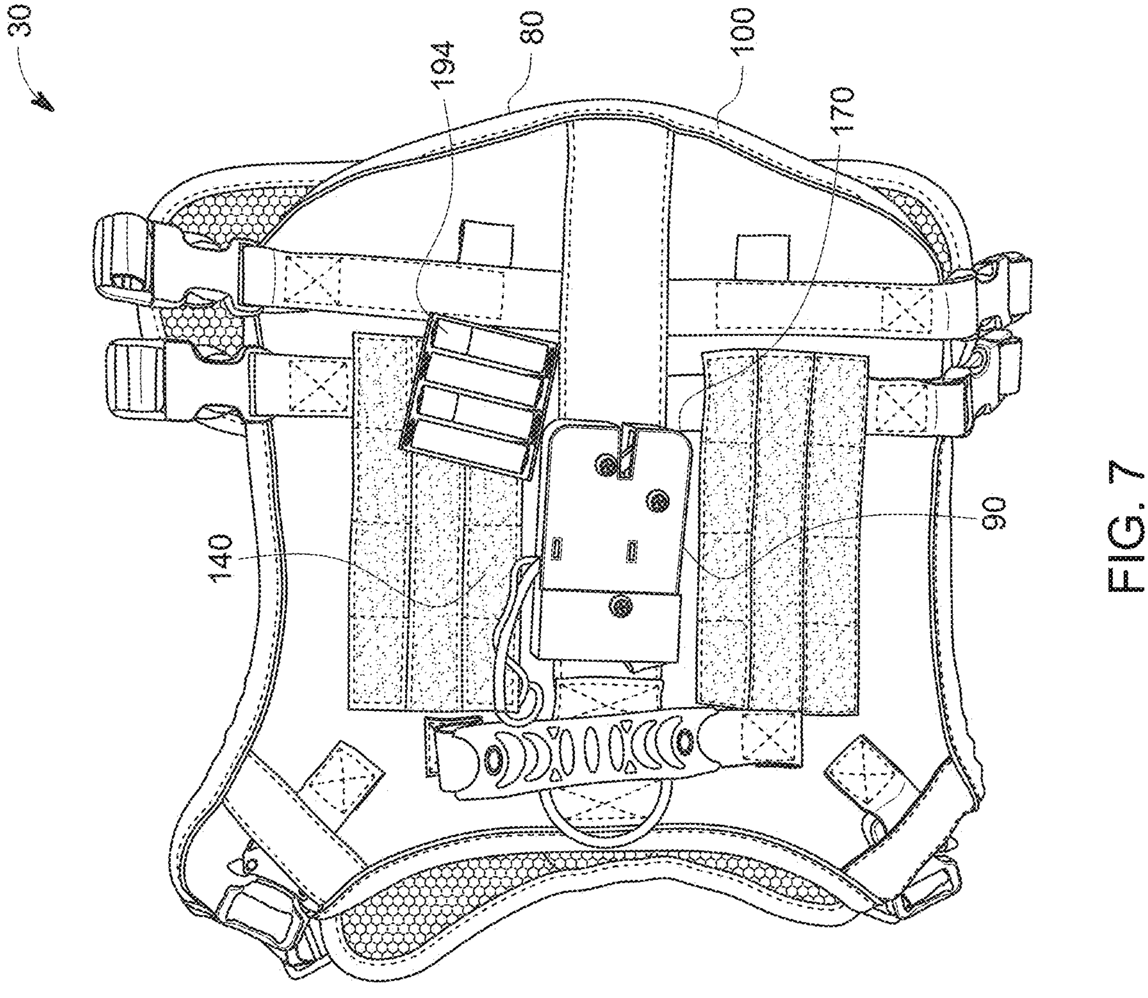
FIG. 7 is a top view of the dog harness assembly of FIG. 3 with a battery module removed from a pocket in the dog harness assembly.
Figure 10:
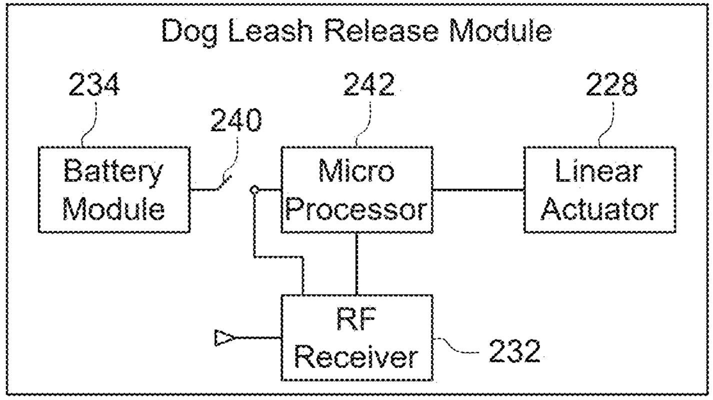
FIG. 10 is a block diagram of a dog leash release module utilized in the remote control release system of FIG. 3.
Figure 11:
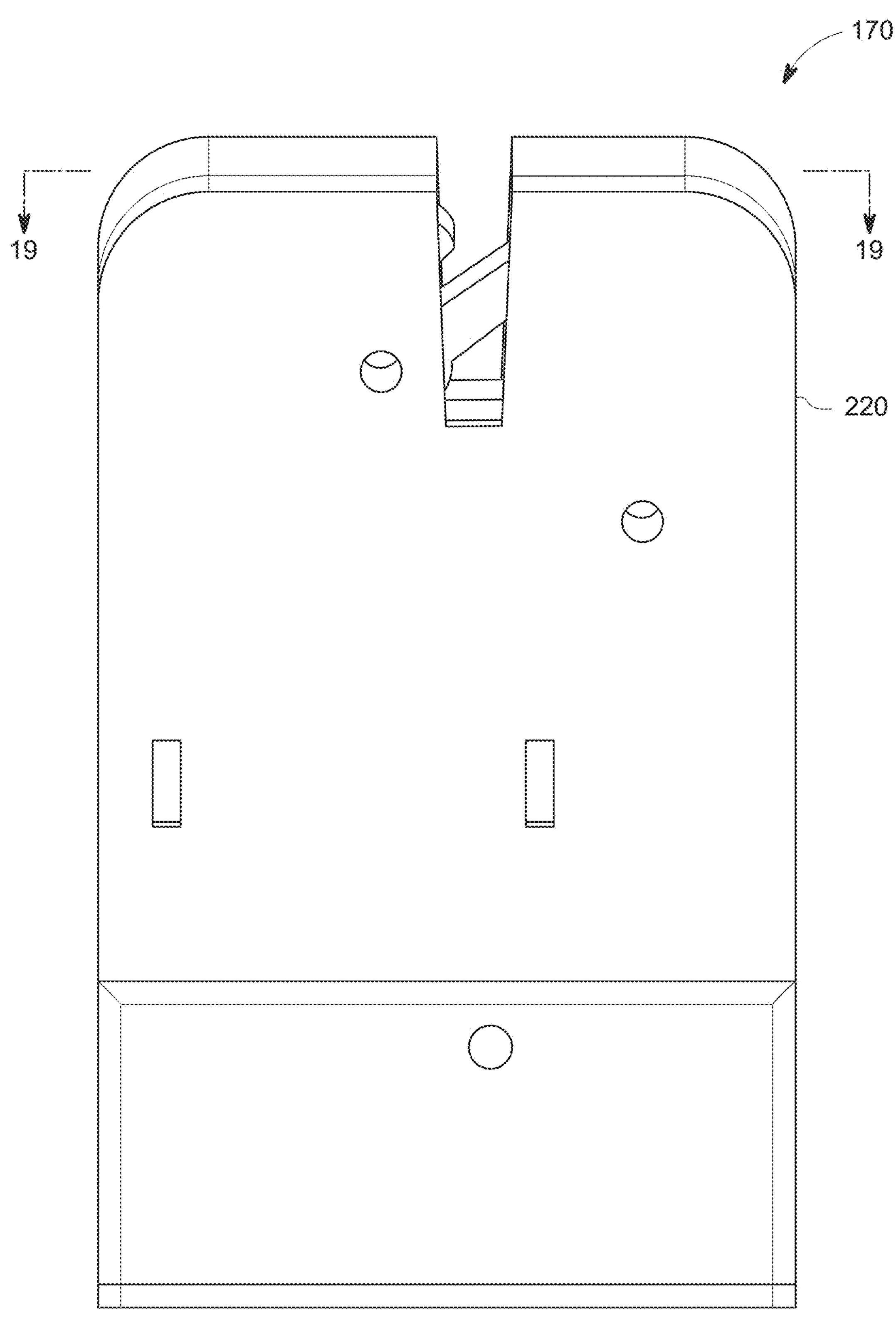
FIG. 11 is an isometric view of a dog leash release module utilized in the remote control release system of FIG. 3.
Figure 12:
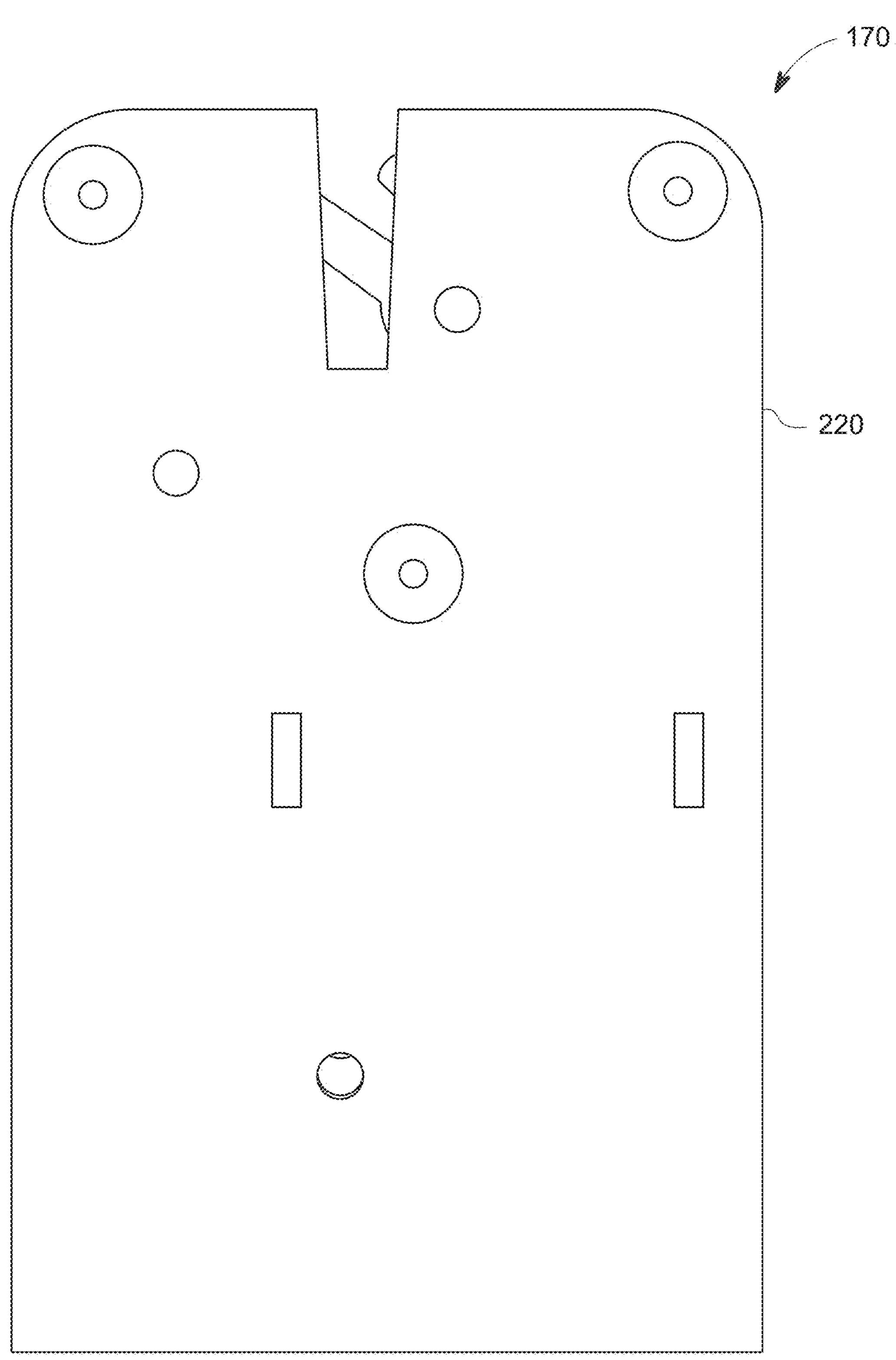
FIG. 12 is a bottom view of the dog leash release module of FIG. 11.
Figure 13:
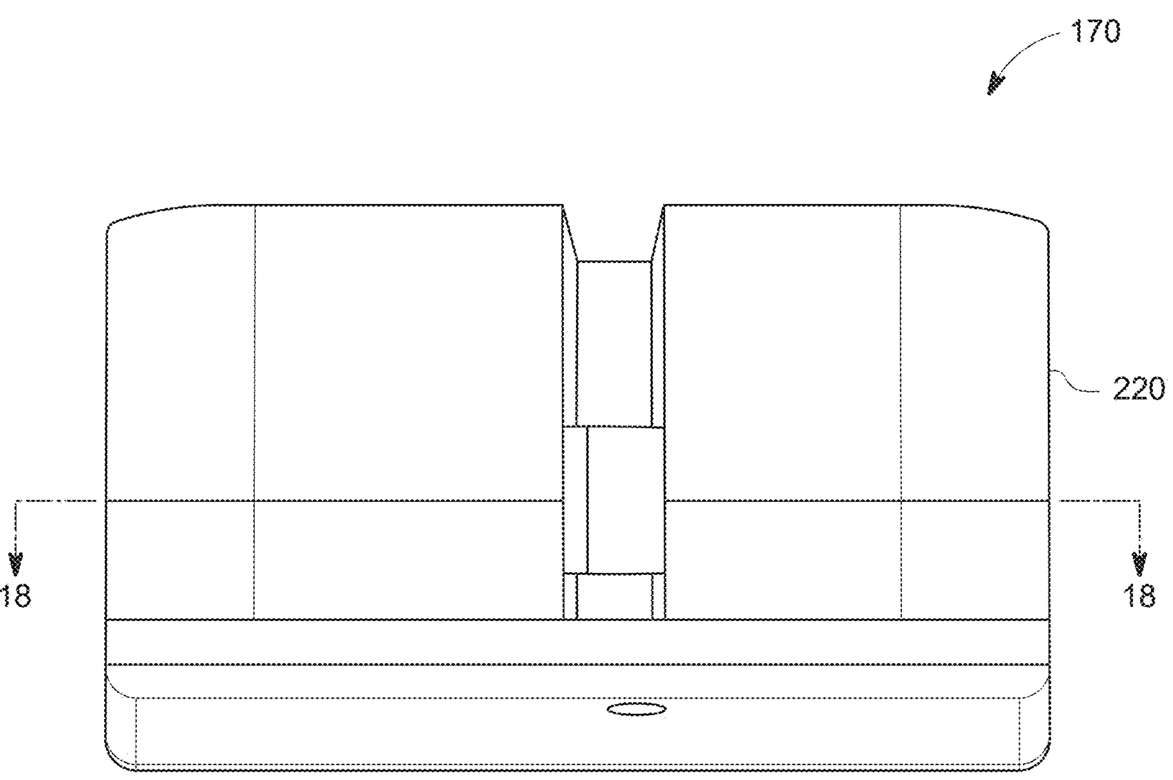
FIG. 13 is a side view of the dog leash release module of FIG. 11.

Referring to FIGS. 6 and 10, the electrical switch 240 is electrically coupled to the battery module 234, and the electrical switch 240 is further electrically coupled to both the microprocessor 242 and the RF receiver 232. When the electrical switch 240 has a closed operational position, an operational voltage from the battery module 234 is received by the microprocessor 242 and the RF receiver 232. Also, when the electrical switch 240 has an open operational position, the operational voltage from the battery module 234 is not received by the microprocessor 242 and the RF receiver 232.

RF Receiver

Referring to FIGS. 9 and 10, the RF receiver 232 is disposed in the housing 220 and is operably coupled to the microprocessor 242 and the electrical switch 240. The RF receiver 232 receives the RF signal from the RF transmitter 192 of the hand-held remote control module 160, and sends a message to the microprocessor 242 in response to the RF signal.

Microprocessor

The microprocessor 242 is provided to control operation of the actuator device 228. The microprocessor 242 generates a control signal to induce the actuator device 228 to move the pivoting arm member 226 from the second operational position (shown in FIG. 19) to the first operational position (shown in FIG. 18) in response to the RF signal from the RF transmitter 192 such that the pivoting arm member 256 disengages from the leash coupling member 222 and the leash coupling member 222 decouples from the leash coupler 60 in the slot 274. Thus, referring to FIG. 1, the dog harness assembly 30 can be released from the dog leash 20 in less than 0.5 seconds utilizing the remote control release system 90.

Dog Leash Release Module

Figure 21:
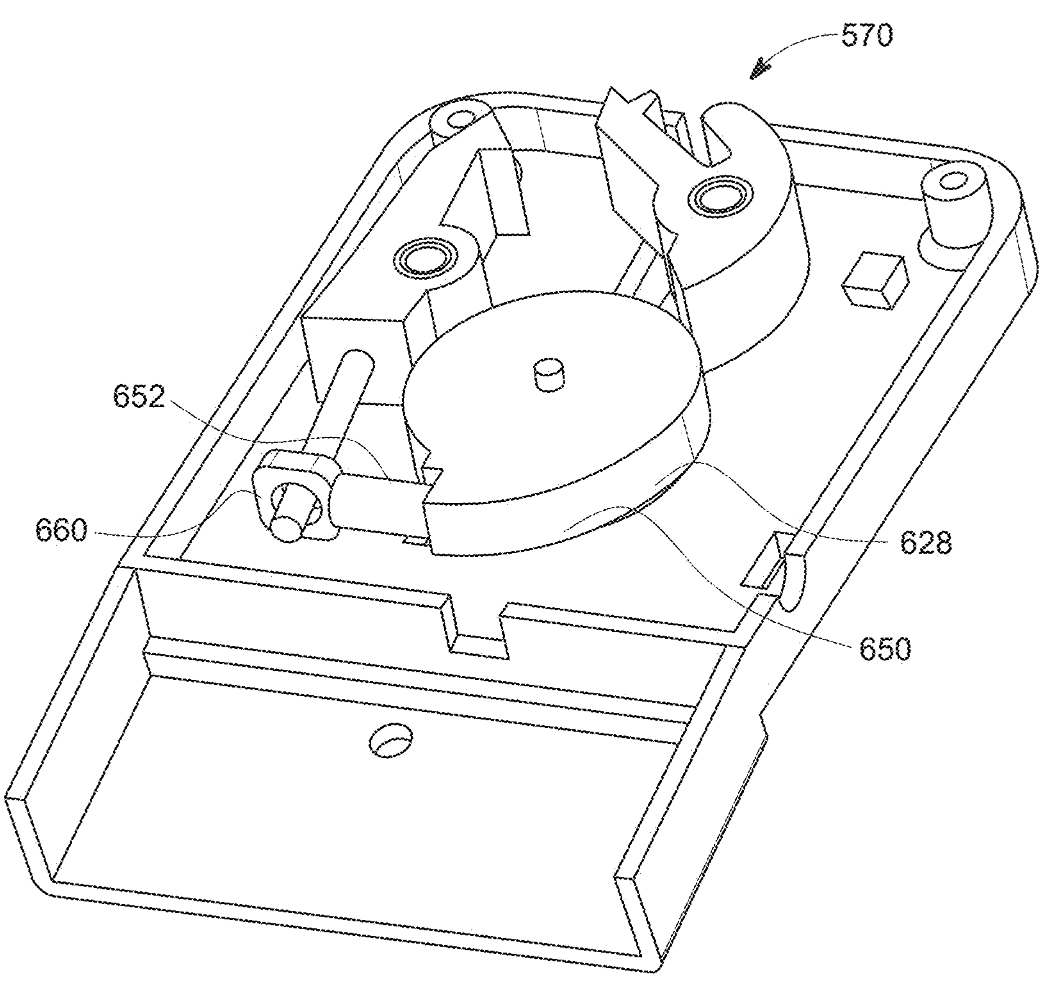
FIG. 21 is another isometric view of the dog leash release module of FIG. 21 having a rotary actuator when a pivoting arm member has a first operational position such the pivoting arm member does not engage a leash coupling member.
Figure 22:
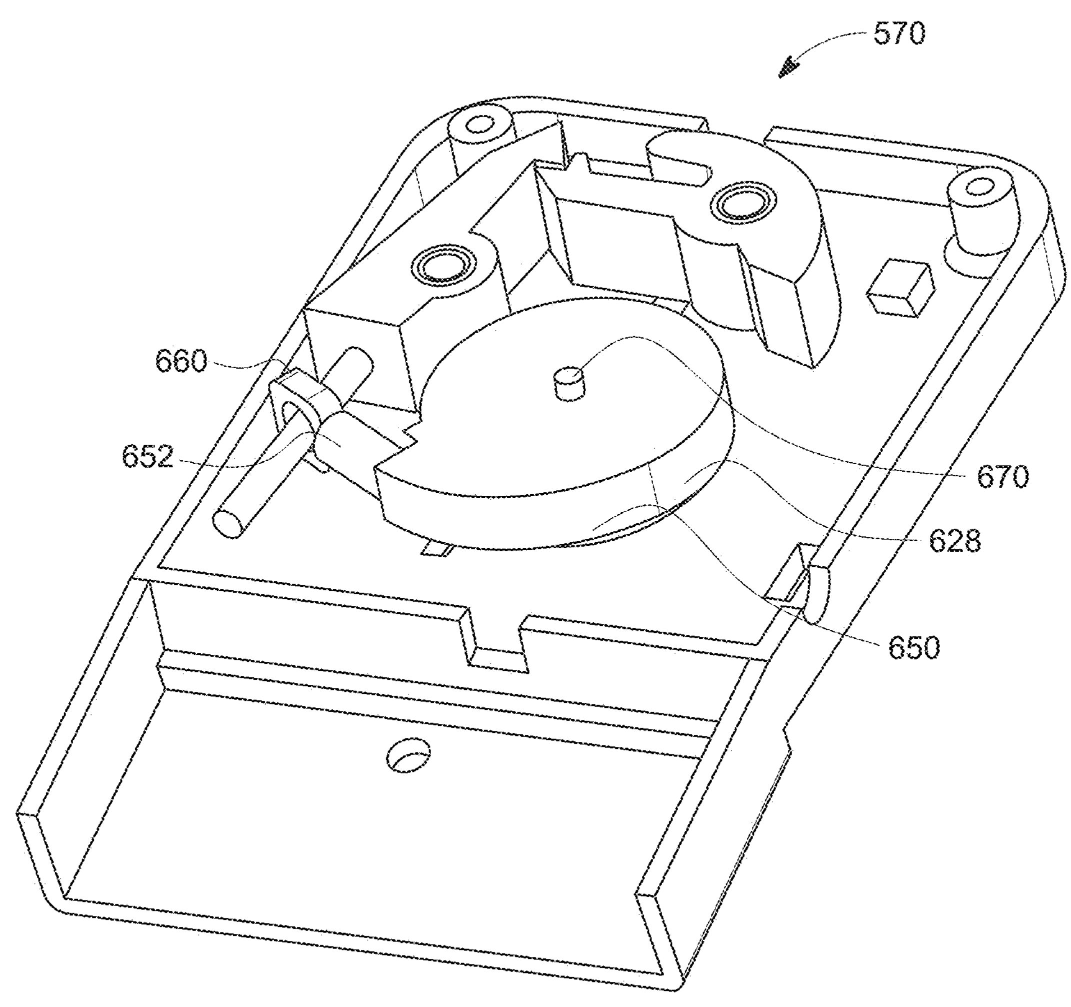
FIG. 22 is an isometric view of a portion of another dog leash release module having a rotary actuator when a pivoting arm member has a second operational position such the pivoting arm member can engage and hold a leash coupling member.

Referring to FIGS. 21 and 22, another dog leash release module 570 that can be utilized instead of the dog leash release module 170 is illustrated. The dog leash release module 570 includes all of the components of module 170 except that the actuator device 628 replaces the actuator device 228. The actuator device 628 is a rotary actuator that rotates about a pin 670 coupled to the housing of the module 570. As shown, the actuator device 628 includes a rotary actuator portion 650 and a shaft member 652. The shaft member 652 has a ring-shaped tip portion 660. The second end portion of the coupling rod extends through the ring-shaped tip portion 660 to couple the second end portion to the shaft member 652.

Referring to FIG. 21, the rotary actuator portion 650 holds the shaft member 452 at a first operational position when the rotary actuator portion 450 does not receive a control signal from the microprocessor such that the pivoting arm member is moved away from the leash coupling member. Further, referring to FIG. 22, the rotary actuator portion 650 rotates the shaft member 652 to a second operational position such that the pivoting arm member contacts and holds the leash coupling member in response to receiving a control signal from a microprocessor.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A remote control release system for a dog leash, comprising:

a dog leash having a leash coupler; and a dog leash release module, the dog leash release module having a housing, a leash coupling member, a pivoting arm member, an actuator device, an RF receiver, and a microprocessor;

the housing having a slot extending therein for receiving the leash coupler therein;

the leash coupling member being rotatably coupled to the housing and having a first finger portion and a second finger portion defining a gap between the first finger portion and the second finger portion, the leash coupling member being biased in a first rotational direction by a spring;

the pivoting arm member being rotatably coupled to the housing, the pivoting arm member having a first operational position such the pivoting arm member does not engage the leash coupling member and the first finger portion does not extend across the slot of the housing such that the leash coupler is received in the gap between the first finger portion and the second finger portion, the pivoting arm member having a second operational position such that a first hook portion of the pivoting arm member contacts and holds a second hook portion of the first finger portion of the leash coupling member and the first finger portion extends across the slot to retain the leash coupler in the gap between the first finger portion and the second finger portion;

the actuator device being disposed in the housing and being operably coupled to the pivoting arm member;

the RF receiver being disposed in the housing and receiving an RF signal; and the microprocessor of the dog leash release module being disposed in the housing and being operably coupled to the RF receiver, the microprocessor of the dog leash release module generating a control signal to induce the actuator device to move the pivoting arm member from the second operational position to the first operational position in response to the RF signal such that the pivoting arm member disengages from the leash coupling member and the leash coupling member decouples from the leash coupler.

2. The remote control release system of claim 1, wherein: the housing holding the leash coupling member, the pivoting arm member, the actuator device, the RF receiver, and the microprocessor therein.

3. The remote control release system of claim 1, wherein: the pivoting arm member having a finger member and a coupling rod; the coupling rod having first and second end portions, the first end portion being coupled to the finger member, the second end portion being coupled to the actuator device.

4. The remote control release system of claim 3, wherein: the actuator device being a linear actuator having a shaft member, the shaft member having a ring-shaped tip portion, the second end portion of the coupling rod extending through the ring-shaped tip portion to couple the second end portion of the coupling rod to the shaft member of the linear actuator.

5. The remote control release system of claim 3, wherein: the leash coupling member further having a central body portion, the central body portion being rotatably coupled to the housing, the first and second finger portions being coupled to and extending from the central body portion.

6. The remote control release system of claim 5, wherein: a longitudinal length of the second finger portion is greater than a longitudinal length of the first finger portion.

7. The remote control release system of claim 5, wherein: the finger member of the pivoting arm member having a first operational location where the finger member does not contact the second finger portion of the leash coupling member.

8. The remote control release system of claim 7, wherein: the finger member of the pivoting arm member having a second operational location where the finger member contacts and holds the second finger portion of the leash coupling member when the leash coupling member is rotated in the second rotational direction by the leash coupler being pushed against the leash coupling member.

9. The remote control release system of claim 8, wherein: the finger member of the pivoting arm member prevents the leash coupling member from rotating in the first rotational direction when the finger member of the pivoting arm member has the second operational location and contacts and holds the second finger portion; and the first finger portion being disposed within the leash coupler in the slot.

10. The remote control release system of claim 3, wherein:

the actuator device being a rotary actuator having a shaft member, the shaft member having a ring-shaped tip portion, the second end portion of the coupling rod extending through the ring-shaped tip portion to couple the second end portion of the coupling rod to the shaft member of the rotary actuator.

11. The remote control release system of claim 1, further comprising:

a battery being electrically coupled to the RF receiver and the microprocessor.

12. The remote control release system of claim 1, wherein:

the housing having lower and upper housing portions being coupled together;

the lower housing portion having a body with first and second apertures extending therethrough that receive first and second bolts respectively therethrough;

the leash coupling member being rotatably coupled to the first bolt; and the pivoting arm member being rotatably coupled to the second bolt.

13. The remote control release system of claim 1, further comprising:

a hand-held remote control module that transmits the RF signal.

14. The remote control release system of claim 13, wherein:

the hand-held remote control module includes an RF transmitter and a switch operably coupled to a microprocessor; the microprocessor of the hand-held remote control module inducing the RF transmitter to transmit the RF signal when the switch has a closed operational position.

15. A dog harness assembly removably coupled to a dog leash, the dog leash having a leash coupler, comprising:

a dog harness;

a remote control release system being coupled to the dog harness, the remote control release system having a dog leash release module, the dog leash release module having a housing, a leash coupling member, a pivoting arm member, an actuator device, an RF receiver, and a microprocessor;

the housing having a slot extending therein for receiving the leash coupler therein;

the leash coupling member being rotatably coupled to the housing and having a first finger portion and a second finger portion defining a gap between the first finger portion and the second finger portion, the leash coupling member being biased in a first rotational direction by a spring;

the pivoting arm member being rotatably coupled to the housing, the pivoting arm member having a first operational position such the pivoting arm member does not engage the leash coupling member and the first finger portion does not extend across the slot of the housing such that the leash coupler is received in the gap between the first finger portion and the second finger portion, the pivoting arm member having a second operational position such that a first hook portion of the pivoting arm member contacts and holds a second hook portion of the first finger portion of the leash coupling member and the first finger portion extends across the slot to retain the leash coupler in the gap between the first finger portion and the second finger portion;

the actuator device being disposed in the housing and being operably coupled to the pivoting arm member;

the RF receiver being disposed in the housing and receiving an RF signal; and the microprocessor being disposed in the housing and being operably coupled to the RF receiver, the microprocessor generating a control signal to induce the actuator device to move the pivoting arm member from the second operational position to the first operational position in response to the RF signal such that the pivoting arm member disengages from the leash coupling member and the leash coupling member decouples from the leash coupler.

16. The dog harness assembly of claim 15, wherein:

the remote control release system further includes a hand-held remote control module that transmits the RF signal.

17. The dog harness assembly of claim 15, wherein:

the actuator device being a linear actuator with a ring-shaped tip portion, the pivoting arm member having a coupling rod extending through the ring-shaped tip portion to couple the pivoting arm member to the shaft member of the linear actuator.

18. The dog harness assembly of claim 15, wherein:

the actuator device being a rotary actuator having a shaft member with a ring-shaped tip portion, the pivoting arm member having a coupling rod extending through the ring-shaped tip portion to couple the pivoting arm member to the rotary actuator.

* * * * *